United States Patent
Konishi et al.

(10) Patent No.: US 12,157,807 B2
(45) Date of Patent: Dec. 3, 2024

(54) RESIN COMPOSITION

(71) Applicant: SUMITOMO CHEMICAL COMPANY, LIMITED, Tokyo (JP)

(72) Inventors: Shota Konishi, Ehime (JP); Hiroyuki Ando, Ehime (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 824 days.

(21) Appl. No.: 17/262,844

(22) PCT Filed: Jul. 23, 2019

(86) PCT No.: PCT/JP2019/028877
§ 371 (c)(1),
(2) Date: Jan. 25, 2021

(87) PCT Pub. No.: WO2020/022339
PCT Pub. Date: Jan. 30, 2020

(65) Prior Publication Data
US 2021/0139670 A1    May 13, 2021

(30) Foreign Application Priority Data
Jul. 26, 2018 (JP) .................................. 2018-140474

(51) Int. Cl.
*C08K 3/00* (2018.01)
*B29C 45/00* (2006.01)
(Continued)

(52) U.S. Cl.
CPC ............ *C08K 3/22* (2013.01); *B29C 45/0001* (2013.01); *C08K 3/36* (2013.01); *B29K 2033/12* (2013.01);
(Continued)

(58) Field of Classification Search
CPC .... C08K 3/22; C08K 3/36; C08K 2003/2227; C08K 2003/2241; C08K 2003/2244; B29K 2509/02
(Continued)

(56) References Cited

U.S. PATENT DOCUMENTS

2004/0265539 A1    12/2004  Hashimoto et al.
2005/0170180 A1     8/2005  Kawa
(Continued)

FOREIGN PATENT DOCUMENTS

CN          1694926 A      11/2005
CN        104718230 A       6/2015
(Continued)

OTHER PUBLICATIONS

Office Action issued in Indonesian Application No. P00202100058 on Oct. 29, 2022 and English translation. 6 pages.
(Continued)

*Primary Examiner* — James E McDonough
(74) *Attorney, Agent, or Firm* — Meunier Carlin & Curfman LLC

(57) ABSTRACT

The present invention provides a resin composition comprising a thermoplastic resin (A), and a flat plate having a thickness of 3 mm obtained by injection molding using only the resin composition as a raw material satisfies all Eqs. 1 to 3 below: (Eq. 1) $x<8$; (Eq. 2) $y<12$; and (Eq. 3) $y<12x^{-0.75}$ [where x is an initial haze (%) of the flat plate measured according to JIS K 7136 before a steel wool abrasion test, y is an amount of change in the haze (%) of the flat plate with respect to the initial haze (%) measured according to JIS K 7136 after the steel wool abrasion test, and the steel wool abrasion test is a test in which #0000 steel wool is pressed against a surface of the flat plate at a pressure of 14 kPa and rubbed back-and-forth 11 times at a speed of 15 cm/sec in
(Continued)

a direction perpendicular to the fiber direction of the steel wool].

7 Claims, 1 Drawing Sheet

(51) Int. Cl.
*C08K 3/22* (2006.01)
*C08K 3/36* (2006.01)
*B29K 33/00* (2006.01)
*B29K 509/02* (2006.01)

(52) U.S. Cl.
CPC .. *B29K 2509/02* (2013.01); *C08K 2003/2227* (2013.01); *C08K 2003/2241* (2013.01); *C08K 2003/2244* (2013.01)

(58) Field of Classification Search
USPC .................................................. 106/287.34
See application file for complete search history.

(56) References Cited

U.S. PATENT DOCUMENTS

| | | |
|---|---|---|
| 2005/0256227 A1 | 11/2005 | Miyamoto et al. |
| 2011/0262750 A1 | 10/2011 | Taima |
| 2015/0299451 A1 | 10/2015 | Satou et al. |
| 2016/0089334 A1 | 3/2016 | Nakayama et al. |

FOREIGN PATENT DOCUMENTS

| | | | | |
|---|---|---|---|---|
| JP | 2004-9362 | 1/2004 | | |
| JP | 2004009362 A | * 1/2004 | ................ | C08J 7/04 |
| JP | 2004-149782 | 5/2004 | | |
| JP | 2004149782 A | * 5/2004 | ............ | B32B 27/36 |
| JP | 2004-223794 | 8/2004 | | |
| JP | 2006-342211 | 12/2006 | | |
| JP | 2009-244623 | 10/2009 | | |
| JP | 2017-222803 A | 12/2017 | | |
| WO | 2009/025127 | 2/2009 | | |

OTHER PUBLICATIONS

Decision of Rejection issued in Chinese Application No. 201980048821.3 on Aug. 26, 2022 and English translation.
Extended European Search Report dated Apr. 8, 2022, from European Application No. 19839849.7, 13 pages.
Official action and search report issued on Dec. 29, 2021 in the corresponding Chinese application No. 201980048821.3.
English Language translation of International Preliminary Report on Patentability and Written Opinion dated Oct. 21, 2019, from International Application No. PCT/JP2019/028877, 12 pages.
Decision of Refusal issued on Jun. 21, 2023, in Japanese Patent Application No. 2020-532412.
International Search Report [English] and Written Opinion dated Oct. 21, 2019, from International Application No. PCT/JP2019/028877, 11 pages.
Office Action issued in Japanese Application No. 2020-532412 on Feb. 7, 2023, and English machine translation. 14 pages.
First Examination Report mailed May 30, 2022 in Indian Application No. 202147002710. 7 pages.

* cited by examiner

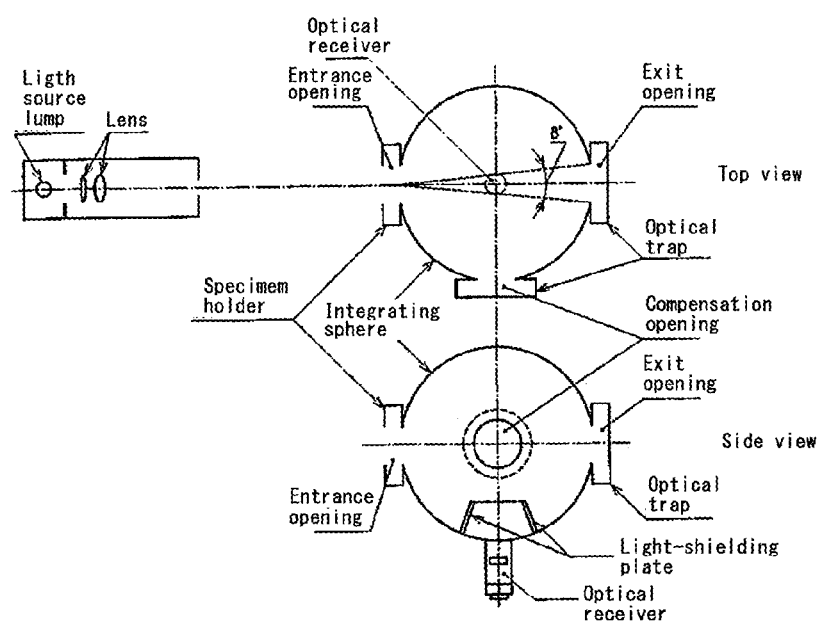

RESIN COMPOSITION

CROSS REFERENCE TO RELATED APPLICATIONS

This application is a United States National Phase Patent Application of International Patent Application Number PCT/JP2019/028877, filed on Jul. 23, 2019, which claims the benefit of priority to JP Application No. 2018-140474, filed Jul. 26, 2018, which are incorporated by reference herein in their entirety.

TECHNICAL FIELD

The present disclosure relates to a resin composition.

BACKGROUND ART

Thermoplastic resins may have excellent transparency, mechanical characteristics, and moldability and therefore are used in various applications.

The thermoplastic resins are mixed with other components and used as thermoplastic resin compositions depending on use. For example, Patent Document 1 discloses, as a transparent thermoplastic resin composition, a composition obtained by mixing silica flakes dispersively containing titania particles with a transparent thermoplastic resin.

CITATION LIST

Patent Literature

Patent Literature 1: Japanese Patent Laid-Open Publication No. 2006-342211

SUMMARY OF THE INVENTION

Technical Problems

The thermoplastic resin composition is required to have both transparency and scratch resistance depending on use, for example, when used for a vehicle member such as a vehicle headlamp. However, it cannot be said that the thermoplastic resin composition described in Patent Document 1 is sufficient from the viewpoint of achieving both transparency and scratch resistance.

It is therefore an object of the present disclosure to provide a resin composition excellent in transparency and scratch resistance.

Solution to Problems

The present disclosure includes the following aspects.
[1] A resin composition comprising: a thermoplastic resin (A),
wherein a flat plate having a thickness of 3 mm obtained by injection molding using only the resin composition as a raw material satisfies all equations 1 to 3 below:

$$x<8; \quad \text{(Eq. 1)}$$

$$y<12; \text{ and} \quad \text{(Eq. 2)}$$

$$y<12x^{-0.75} \quad \text{(Eq. 3)}$$

wherein x is an initial haze (%) of the flat plate measured according to JIS K 7136 before a steel wool abrasion test, y is an amount of change in the haze (%) of the flat plate with respect to the initial haze (%) measured according to JIS K 7136 after the steel wool abrasion test, and the steel wool abrasion test is a test in which #0000 steel wool is pressed against a surface of the flat plate at a pressure of 14 kPa and rubbed back-and-forth 11 times at a speed of 15 cm/sec in a direction perpendicular to the fiber direction of the steel wool.
[2] The resin composition according to [1] comprising the thermoplastic resin (A) and silica composite oxide particles (B).
[3] The resin composition according to [2] wherein the content of the silica composite oxide particles (B) in the resin composition is 0.001 part by mass or more and 5 parts by mass or less with respect to 100 parts by mass of the thermoplastic resin (A).
[4] The resin composition according to [2] or [3] wherein a difference in refractive index between the silica composite oxide particles (B) and the thermoplastic resin (A) when they are each irradiated with a light beam having a wavelength of 589 nm at 25° C. is 0.03 or less.
[5] The resin composition according to any one of [2] to [4] wherein the silica composite oxide is a silica-titania composite oxide, a silica-zirconia composite oxide, or a silica-alumina composite oxide.
[6] The resin composition according to any one of [2] to [5] wherein the thermoplastic resin (A) is a methacrylic resin.
[7] The resin composition according to any one of [2] to [6] wherein
the thermoplastic resin (A) is a methacrylic resin containing monomer units derived from methyl methacrylate at 85 to 100% by mass,
the silica composite oxide is a silica-titania composite oxide containing titanium atoms at 0.01 to 10 mol % with respect to 100 mol % of all atoms of the silica composite oxide, and
the content of the silica-titania composite oxide in the resin composition is 0.01 part by mass or more and 5 parts by mass or less with respect to 100 parts by mass of the methacrylic resin.
[8] The resin composition according to any one of [2] to [6] wherein
the thermoplastic resin (A) is a methacrylic resin containing monomer units derived from methyl methacrylate at 85 to 100% by mass,
the silica composite oxide is a silica-zirconia composite oxide containing zirconium atoms at 0.01 to 10 mol % with respect to 100 mol % of all atoms of the silica composite oxide, and
the content of the silica-zirconia composite oxide in the resin composition is 0.01 part by mass or more and 5 parts by mass or less with respect to 100 parts by mass of the methacrylic resin.
[9] The resin composition according to any one of [2] to [8] wherein the silica composite oxide particles (B) in the resin composition form no aggregate image completely enclosing a 10 nm diameter circle in at least one of 10 images obtained by photographing the silica composite oxide particles (B) by using a TEM-EDX with a field of view of 310 nm×310 nm.
[10] The resin composition according to any one of [2] to [7] and [9] wherein
a portion or all of the silica composite oxide particles (B) in the resin composition is a silica-titania composite oxide, the silica-titania composite oxide in the resin composition has an absorption intensity of 0.5 or more in an XAFS spectrum at a K absorption edge of Ti, and the absorption intensity is an absorption intensity at the incident X-ray energy of 4967.5 eV when the absorption intensity at the incident X-ray energy of 5128.0 eV has been standardized as 1.0.

[11] A resin composition comprising: a thermoplastic resin (A); and silica composite oxide particles (B), wherein the content of the silica composite oxide particles (B) in the resin composition is 0.001 part by mass or more and 5 parts by mass or less with respect to 100 parts by mass of the thermoplastic resin (A), and a difference in refractive index between the silica composite oxide particles (B) and the thermoplastic resin (A) at a wavelength of 589 nm measured at 25° C. is 0.03 or less.

[12] A molded body comprising: the resin composition according to any one of [1] to [11].

[13] A laminated body comprising:

a layer containing the resin composition according to any one of [1] to [10]; and a layer containing a thermoplastic resin (C), wherein a flat plate having a thickness of 3 mm obtained by injection molding using only the thermoplastic resin (C) as a raw material satisfies equation 1' and does not satisfy at least one of equations 2 and 3 below:

$$x \leq 2; \quad \text{(Eq. 1')}$$

$$y < 12; \text{ and} \quad \text{(Eq. 2)}$$

$$y < 12x^{-0.75} \quad \text{(Eq. 3)}$$

wherein x is an initial haze (%) of the flat plate measured according to JIS K 7136 before a steel wool abrasion test, y is an amount of change in the haze (%) of the flat plate with respect to the initial haze (%) measured according to JIS K 7136 after the steel wool abrasion test, and the steel wool abrasion test is a test in which #0000 steel wool is pressed against a surface of the flat plate at a pressure of 14 kPa and rubbed back-and-forth 11 times at a speed of 15 cm/sec in a direction perpendicular to the fiber direction of the steel wool.

[14] A laminated body comprising:

a layer containing the resin composition according to [11]; and a layer containing a thermoplastic resin (C), wherein a flat plate having a thickness of 3 mm obtained by injection molding using only the thermoplastic resin (C) as a raw material satisfies equation 1' below:

$$x \leq 2 \quad \text{(Eq. 1')}$$

wherein x is an initial haze (%) of the flat plate measured according to JIS K 7136 before a steel wool abrasion test, and the content of the silica composite oxide particles (B) in the layer containing the thermoplastic resin (C) is less than 0.001 part by mass with respect to 100 parts by mass of the thermoplastic resin (C).

Advantageous Effects of Invention

The present disclosure can provide the resin composition having excellent transparency and scratch resistance.

BRIEF DESCRIPTION OF DRAWINGS

FIG. 1 is a diagram for explaining JIS K 7136.

DESCRIPTION OF EMBODIMENTS

The invention of the present disclosure will now be described in detail.

A resin composition of the present disclosure contains a thermoplastic resin (A).

Examples of the thermoplastic resin (A) include (meth) acrylic resins, polycarbonate resins, polyetherimide resins, polyester resins, and the like, polystyrene resins, polyethersulfone resins, fluorine-based resins, ABS (acrylonitrile-butadiene-styrene) resins, AS (acrylonitrile-styrene) resins, polyvinyl chloride and polyolefin resins. The thermoplastic resin to be used may appropriately be selected according to desired characteristics. The thermoplastic resin may be one resin or a mixture of two or more resins. From the viewpoint of transparency and scratch resistance, the (meth)acrylic resins are preferable, and methacrylic resins are more preferable. These resins may be used alone or in combination of two or more.

As used herein, the term "(meth)acrylic resins" comprise acrylic resins and methacrylic resins.

The methacrylic resin is a polymer having monomer units derived from a monomer having a methacrylic group.

Examples of the methacrylic resin include a methacrylic homopolymer containing only monomer units derived from alkyl methacrylate with an alkyl group having 1 to 4 carbon atoms; and a methacrylic copolymer containing monomer units derived from alkyl methacrylate with an alkyl group having 1 to 4 carbon atoms at 85% by mass or more and less than 100% by mass and monomer units derived from another vinyl monomer copolymerizable with alkyl methacrylate with an alkyl group having 1 to 4 carbon atoms at more than 0% by mass and 15% by mass or less.

The "alkyl methacrylate with an alkyl group having 1 to 4 carbon atoms" is a compound represented by $CH_2=CH(CH_3)COOR$ wherein R is an alkyl group having 1 to 4 carbon atoms. The vinyl monomer copolymerizable with an alkyl methacrylate with an alkyl group having 1 to 4 carbon atoms is a monomer having a vinyl group and copolymerizable with alkyl methacrylate with an alkyl group having 1 to 4 carbon atoms.

Examples of the alkyl methacrylate with an alkyl group having 1 to 4 carbon atoms include methyl methacrylate, ethyl methacrylate, n-propyl methacrylate, isopropyl methacrylate, n-butyl methacrylate, tert-butyl methacrylate, sec-butyl methacrylate, and isobutyl methacrylate. The alkyl methacrylate with an alkyl group having 1 to 4 carbon atoms is preferably methyl methacrylate. The alkyl methacrylate may be used alone, or as a mixture of two or more.

Examples of the vinyl monomer copolymerizable with alkyl methacrylate with an alkyl group having 1 to 4 carbon atoms include: methacrylic acid esters such as cyclohexyl methacrylate, benzyl methacrylate, 2-ethylhexyl methacrylate, 2-hydroxyethyl methacrylate, hydroxypropyl methacrylate, and monoglycerol methacrylate (excluding the alkyl methacrylate with an alkyl group having 1 to 4 carbon atoms); acrylic acid esters such as methyl acrylate, ethyl acrylate, propyl acrylate, butyl acrylate, 2-ethylhexyl acrylate, 2-hydroxyethyl acrylate, 2-hydroxypropyl acrylate, and monoglycerol acrylate; unsaturated carboxylic acids such as acrylic acid, methacrylic acid, maleic acid, itaconic acid, maleic anhydride, and itaconic anhydride, or acid anhydrides thereof; nitrogen-containing monomers such as acrylamide, methacrylamide, acrylonitrile, methacrylonitrile, diacetoneacrylamide, and dimethylaminoethyl methacrylate; epoxy group-containing monomers such as allyl glycidyl ether, glycidyl acrylate, and glycidyl methacrylate; and styrene-based monomers such as styrene and α-methylstyrene.

Examples of a method for producing a methacrylic resin include a method for polymerizing the alkyl methacrylate with an alkyl group having 1 to 4 carbon atoms and, if necessary, the vinyl monomer copolymerizable with the alkyl methacrylate with an alkyl group having 1 to 4 carbon atoms by a method such as bulk polymerization, solution polymerization, suspension polymerization, emulsion polymerization, or the like.

Polycarbonate Resin

As used herein, the "polycarbonate resin" is a polycarbonate resin containing a structural unit derived from a dihydroxy compound. Examples of the polycarbonate resin usable as the thermoplastic resin in the present disclosure include those obtained by reacting a dihydroxy compound such as dihydric phenol or isosorbide with a carbonylating agent by an interfacial polycondensation method, a melt transesterification method, or the like; those obtained by polymerizing a carbonate prepolymer by a solid phase transesterification method or the like; and those obtained by polymerizing a cyclic carbonate compound by a ring-opening polymerization method.

Examples of the dihydric phenol include hydroquinone, resorcinol, 4,4'-dihydroxydiphenyl, bis(4hydroxyphenyl) methane, bis{(4-hydroxy-3,5-dimethyl)phenyl}methane, 1,1-bis(4-hydroxyphenyl)ethane, 1,1-bis(4-hydroxyphenyl)-1-phenylethane, 2,2-bis(4-hydroxyphenyl)propane (commonly known as Bisphenol A), 2,2-bis{(4-Hydroxy-3-methyl)phenyl}propane, 2,2-bis{(4-hydroxy-3,5-dimethyl) phenyl}propane, 2,2-bis{(4-hydroxy-3,5-dibromo)) phenyl}propane, 2,2-bis{(3-isopropyl-4-hydroxy) phenyl}propane, 2,2-bis{(4-hydroxy-3-phenyl) phenyl}propane, 2,2-bis(4-hydroxyphenyl)butane), 2,2-bis(4-hydroxyphenyl)-3-methylbutane, 2,2-bis(4-hydroxyphenyl)-3,3-dimethylbutane, 2,4-bis(4-hydroxy) phenyl)-2-methylbutane, 2,2-bis(4-hydroxyphenyl)pentane, 2,2-bis(4-hydroxyphenyl)-4-methylpentane, 1,1-bis(4-hydroxyphenyl)cyclohexane, 1,1-bis(4-hydroxyphenyl)-4-isopropylcyclohexane, 1,1-bis(4-hydroxyphenyl)-3,3,5-trimethylcyclohexane, 9,9-bis(4-hydroxyphenyl)fluorene, 9,9-bis{(4-Hydroxy-3-methyl)phenyl}fluorene, α,α'-bis(4-hydroxyphenyl)-o-diisopropylbenzene, α,α'-bis(4-hydroxyphenyl)-m-diisopropylbenzene, α,α'-bis(4-hydroxyphenyl)-p-diisopropylbenzene, 1,3-bis(4-hydroxyphenyl)-5,7-dimethyladamantan, 4,4'-dihydroxydiphenylsulfone, 4,4'-dihydroxydiphenylsulfoxide, 4,4'-dihydroxydiphenylsulfide, 4,4'-dihydroxydiphenylketone, 4,4'-dihydroxydiphenyl ether, and 4,4'-dihydroxydiphenyl ester. These may be used alone or in combination of two or more.

Among these dihydric phenols, Bisphenol A, 2,2-bis{(4-hydroxy-3-methyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,2-bis(4-hydroxyphenyl)-4-methylpentane, 1,1-bis(4-hydroxyphenyl)-3,3,5-trimethylcyclohexane, and α,α'-bis(4-hydroxyphenyl)-m-diisopropylbenzene are preferred. Particularly, preferably, Bisphenol A is used alone, or Bisphenol A and at least one selected from the group consisting of 1,1-bis(4-hydroxyphenyl)-3,3,5-trimethylcyclohexane, 2,2-bis{(4-hydroxy-3-methyl)phenyl}propane, and α,α'-bis (4-hydroxyphenyl)-m-diisopropylbenzene are used together.

Examples of the carbonylating agent include carbonyl halide (for example, phosgene), carbonate ester (for example, diphenyl carbonate), and haloformate (for example, dihaloformate of dihydric phenol). These may be used alone or in combination of two or more.

In one embodiment, the resin composition of the present disclosure comprises silica composite oxide particles (B).

The silica composite oxide means a material in which a portion of the silicon elements (Si) in silica is replaced with another element, i.e., a material in which silicon and another element form an oxide having a uniform structure together. The structure of the silica composite oxide can be analyzed by an X-ray absorption fine structure (XAFS) spectrum.

The other element is not particularly limited as long as the element is an element other than silicon and oxygen and can form an oxide having a uniform structure together with silicon. Examples of the other element include an element of groups 2 to 14, preferably titanium, zirconium, aluminum, zinc, chromium, manganese, magnesium, cerium, boron, iron, indium, and tin. In a more preferably embodiment, the other element is titanium, zirconium, or aluminum, more preferably titanium.

Therefore, in one embodiment, the silica composite oxide may be a silica-titania composite oxide, a silica-zirconia composite oxide, or a silica-alumina composite oxide, preferably a silica-titania composite oxide, or a silica-zirconia composite oxide, more preferably a silica-titania composite oxide.

The silica composite oxide particles contain the silica composite oxide. The silica composite oxide particles are preferably substantially composed of a silica composite oxide or may contain, for example, an aggregate of a substance containing the other element described above other than the silica composite oxide (hereinafter, also simply referred to as "aggregate"). As described above, the other element may be an element other than silicon and oxygen; however, the "aggregate of a substance containing the other element" means an aggregate containing at least an element other than silicon and oxygen, and it does not exclude to contain silicon and oxygen. Therefore, in other words, the silica composite oxide particles contain the silica composite oxide and may further contain an aggregate, and the aggregate contains at least an element other than silicon and oxygen.

When the aggregate is contained in the silica composite oxide particles (B), in at least one of 10 images obtained by photographing the silica composite oxide particles (B) by using a TEM-EDX (Transmission Electron Microscope-Energy dispersive X-ray spectrometry) with a field of view of 310 nm×310 nm, photographed aggregate images comprise no aggregate image completely enclosing a 10 nm diameter circle. That is, in the at least one image, all the photographed aggregate images are images not completely enclosing a 10 nm diameter circle. In the TEM-EDX of the silica composite oxide particles (B), the silica composite oxide particles (B) may be directly measured or an insoluble component when the resin composition is immersed in a solvent such as chloroform capable of dissolving the thermoplastic resin (A) may be recovered and measured. By setting the diameter of the circle that can enclosed by image of the aggregate in the resin composition obtained by the TEM-EDX to less than 10 nm, a molded body having higher transparency can be obtained.

In one embodiment, the content of the other element contained in the silica composite oxide particles (B) is preferably 0.01 to 10 mol %, more preferably 0.1 to 5 mol %, further preferably 1 to 5 mol %, for example, 1.5 to 3 mol %, with respect to all the atoms of the silica composite oxide particles. The content of the other element contained in the silica composite oxide can be measured by the ICP-AES method, the SEM-EDX method, the TEM-EDX method, or the like.

The shape of the silica composite oxide particles (B) may be substantially spherical, rectangular parallelepiped, or a pulverized shape having multiple corners, or the like. The shape of the silica composite oxide particles is preferably substantially spherical, more preferably spherical.

An average primary particle diameter of the silica composite oxide particles (B) to be used in the present disclosure is 0.1 μm or more and 2 μm or less, more preferably 0.2 μm or more and 1.5 μm or less, further preferably 0.3 μm or more 1.0 μm or less. The average primary particle size can be measured, for example, by a laser diffraction type particle size distribution measuring apparatus. By setting the average primary particle diameter of the silica composite oxide particles within the above range, a molded body excellent in both scratch resistance and transparency can be provided. The primary particles mean the minimum unit particles constituting the silica composite oxide particles.

When the silica composite oxide particles (B) are spherical, the average particle size (diameter) of the silica composite oxide particles is preferably 0.1 μm or more and 2 μm or less, more preferably 0.2 μm or more and 1.5 μm or less, further preferably 0.3 μm or more and 1.0 μm or less. When the silica composite oxide particles are not spherical, the average major axis of the silica composite oxide particles is preferably 0.1 μm or more and 2 μm or less, more preferably more than 0.2 μm and 1.5 μm or less. As used herein, the "major axis" means a length of the longest portion of the particle in terms of linear distance. The average major axis and the average particle size can be measured by reading from an image of the particles observed by a scanning electron microscope. By setting the average major axis or the average particle size of the silica composite oxide particles within the above range, a molded body excellent in both scratch resistance and transparency may be provided. In this description, the average particle size means a median diameter (d50).

The silica composite oxide particles (B) have a refractive index of preferably 1.47 or more and 1.60 or less, more preferably 1.48 or more and 1.52 or less, further preferably 1.49 or more and 1.51 or less. By setting the refractive index of the silica composite oxide particles within the above range, a molded body of the resin composition having high transparency can be obtained. In this description, the refractive index means a refractive index of a light beam having a wavelength of 589 nm measured at 25° C.

A difference in the refractive index between the thermoplastic resin (A) and the silica composite oxide particles (B) irradiated with a light beam having a wavelength of 589 nm at 25° C. is preferably 0.03 or less, more preferably 0.02 or less, further preferably 0.01 or less. Particularly preferably, both have the same refractive index. By setting the difference in refractive index between them to 0.03 or less, a molded body of the resin composition having high transparency can be obtained. By making the difference in refractive index between them smaller, a molded body having higher transparency can be obtained.

The refractive index of the thermoplastic resin (A) can be measured by using a critical angle method, a V block method, an immersion method, or the like. The refractive index of the silica composite oxide particles (B) can be measured by using an immersion method, or the like.

The silica composite oxide particles (B) can be obtained by a known method such as a flame melting method, a flame hydrolysis method, and a sol-gel method.

As the silica composite oxide particles (B), for example, silica-titania SiTiO449 (average particle size: 0.4 μm, refractive index: 1.49), silica-titania SiTiO448 (average particle size: 0.4 μm, refractive index: 1.48), silica-titania SiTiO450 (average particle size: 0.4 μm, refractive index: 1.50), silica-titania SiTiO451 (average particle size: 0.4 μm, refractive index: 1.51), silica-titania SiTiO452 (average particle size: 0.4 μm, refractive index: 1.52), silica-titania SiTiO349 (average particle size: 0.3 μm, refractive index: 1.49), silica-titania SiTiO849 (average particle size: 0.8 μm, refractive index: 1.49), silica-zirconia SiZrO452 (average particle size: 0.4 μm, refractive index: 1.52), or the like can be used.

When the resin composition of the present disclosure contains the thermoplastic resin (A) and the silica composite oxide particles (B), the content of the silica composite oxide particles (B) contained in the resin composition is preferably 0.001 part by mass or more and 5 parts by mass or less, more preferably 0.01 part by mass or more and 5 parts by mass or less, further preferably 0.01 part by mass or more and 1 part by mass or less, with respect to 100 parts by mass of the thermoplastic resin (A). The content of the silica composite oxide particles (B) in the resin composition can be measured by using an ICP-AES method. A supply concentration of the silica composite oxide particles (B) at the time of melt-kneading of the thermoplastic resin (A) and the silica composite oxide particles (B) may be used as the content. Although both values are basically the same, the measurement is preferably performed by the ICP-AES method from the viewpoint of accuracy. By setting the content of the silica composite oxide particles (B) to 0.001 part by mass or more, a molded body of the resin composition having high scratch resistance can be obtained. By setting the content of the silica composite oxide particles (B) to 5 parts by mass or less, a molded body of the resin composition having high transparency can be obtained.

The resin composition of the present disclosure preferably satisfies all equations 1 to 3 below in a flat plate having a thickness of 3 mm obtained by injection molding using only the resin composition of the present disclosure as a raw material:

$$x<8; \tag{Eq. 1}$$

$$y<12; \text{ and} \tag{Eq. 2}$$

$$y<12x^{-0.75} \tag{Eq. 3}$$

wherein x is an initial haze (%) of the flat plate measured according to JIS K 7136 before a steel wool abrasion test, and y is an amount of change in the haze (%) of the flat plate with respect to the initial haze (%) measured according to JIS K 7136 after the steel wool abrasion test, and the steel wool abrasion test is a test in which #0000 steel wool is pressed against a surface of the flat plate at a pressure of 14 kPa and rubbed back-and-forth 11 times at a speed of 15 cm/sec in a direction perpendicular to the fiber direction of the steel wool].

For x, preferably x<5, more preferably x<2.
For y, preferably y<10, more preferably y<6.
A relationship between x and y is preferably $y<10x^{-0.75}$, more preferably $y<6x^{-0.75}$.

By satisfying equations (1) to (3), a molded body having higher transparency and scratch resistance can be obtained.

The method for measuring haze according to JIS K 7136 is as follows.

Foreword

This standard is a Japanese Industrial Standard created by translating ISO14782, Plastics-Determination of haze for transparent materials published as the first edition in 1999, without changing the technical contents and the format of the standard sheets.

1. Scope of Application

This standard specifies how to determine haze, which is a specific optical property for wide-angle scattering of light beam, for transparent and essentially colorless plastics. This test method can be applied to materials having a haze value of 40% or less measured by this method.

2. Definition

Haze refers to percentage of transmitted light passing through a specimen and deviating from the incident light by 0.044 rad) (2.5°) or more due to forward scattering.

3. Apparatus 3-1. The apparatus is made up of a stable light source, a connecting optical system, and an integrating sphere with an opening and a photometer, and the photometer is made up of an optical receiver, a signal processing apparatus, and a display apparatus or a recorder (see FIG. 1).

3-2. The light source and photometer used must provide outputs having combined characteristics through a filter corresponding to a combination of a photopic standard visual efficiency V ($\lambda$) (defined in IEC60050-845) equal to a color-matching function y ($\lambda$) according to ISO/CIE10527 and CIE standard illuminant D65 specified in ISO/CIE 10526. The output of the photometer must be proportional to the incident luminous flux within 1% in the range of the luminous flux used. It is desirable that the spectral characteristics and the photometric characteristics of the light source and the photometer are kept constant during measurement.

3-3. The light source is combined with an optical system to create a parallel luminous flux. The maximum angle between any light beam contained in this luminous flux and the optical axis must not exceed 0.05 rad (3°). This luminous flux must not be blurred at either opening portion of the integrating sphere.

3-4. The apparatus needs to be designed such that the reading is constant when the luminous flux does not exist.

3-5. The integrating sphere is used to collect the transmitted luminous flux. The diameter of the integrating sphere may have any value as long as the area of all the opening portions does not exceed 3.0% of the inner area of the integrating sphere. The diameter of the integrating sphere is desirable 150 mm or more so that a large sample can be measured.

3-6. The integrating sphere has an entrance opening, an exit opening, a compensation opening, and a light receiving opening (see FIG. 1). The centers of the entrance and exit openings are on the same great circle of the sphere, and a central angle of an arc on the great circle corresponding to the centers of the openings is 3.14 rad±0.03 rad (180±2°). The angle formed by the diameter of the exit opening to the center of the entrance opening is 0.140 rad±0.002 rad (8±0.1°). The exit opening and the compensation opening have the same size. The entrance opening, the compensation opening, and the light receiving opening must not be on the same great circle of the integrating sphere. The compensation opening is disposed at a position where the central angle to the entrance opening is within 1.57 rad (90°).

3-7. If no sample is placed at the entrance opening, the cross section of the luminous flux at the exit opening must be approximately circular and clear, must be concentric with the exit opening, and must have an annular portion remaining around the exit opening. The angle formed by the annular portion to the center of the entrance opening is 0.023 rad±0.002 rad (1.3°±0.1°).

3-8. A light-shielding plate is attached to the integrating sphere so that the light receiver does not directly detect the light passing through the sample. The light receiver forms the central angle of 1.57 rad±0.26 rad (90°±15°) from the entrance opening on the integrating sphere. Optical traps placed at the exit and compensation openings must completely absorb light in the absence of the sample, or the apparatus must be designed so that no optical traps are required at the exit and compensation openings.

3-9. $Y_{10}$ of tristimulus values of the inner surface of the integrating sphere, the light-shielding plate, and a reference white plate (usually, this is supplied from an apparatus manufacturer) obtained according to ISO772-2 must be within a range of 90% or more, and fluctuations thereof must be within ae range of ±3%. If it is difficult to directly measure the reflectance of the inner surface of the integrating sphere, a surface created separately under the same materials and conditions as the inner surface may be measured.

3-10. A specimen holder fixes the specimen at a right angle within ±2° relative to the luminous flux and mounts the specimen as close to the integrating sphere as possible so that all transmitted light comprising diffused light can be captured. The holder can hold the flexible specimen flat. A thin flexible film is preferably sandwiched at ends thereof between a double ring-shaped holder or attached to ends of the holder with double-sided adhesive tape. The latter method is also used for a thick specimen that cannot be attached to the double ring-shaped holder. The specimen may be attached to a sample table by using a vacuum pump or a vacuum suction plate.

4. Specimen 4-1. The specimen is cut out from a film, a sheet, or a molded item obtained by injection molding or compression molding.

4-2. The specimen must be free of defects, dust, grease, adhesives from protective materials, scratches, dirt, etc., and must be free of visible voids and foreign matters.

4-3. The specimen is large enough to cover the entrance and compensation openings of the integrating sphere. A disk having a diameter of 50 mm or a square having a side of 50 mm is preferable.

4-4. Unless otherwise specified, three specimens are prepared for each sample of a test material.

5. Conditioning 5-1. The specimen is conditioned according to ISO291 under conditions of temperature of (23±2)° C. and relative humidity of (50±10) % for 40 hours or more before the test as needed.
5-2. The test apparatus is installed in an atmosphere maintained at a temperature of (23±2)° C. and a relative humidity of (50±10) % as needed.

6. Procedure 6-1. A sufficient time is taken before the test to make the test apparatus thermally-equilibrated.
6-2. The specimen is attached to the specimen holder.
6-3. Four values (τ1, τ2, τ3, and τ4) described in the table below are read from the meter.
6-4. The thickness of the specimen is measured at three points and is accurately measured to 0.02 mm for a sheet and 1 μm for a film.
6-5. The procedure described above is sequentially performed for three specimens.

|    | Entrance opening | Exit opening | Compensation opening |
|----|------------------|--------------|----------------------|
| τ1 |                  | reference white plate | optical trap |
| τ2 | specimen         | reference white plate | optical trap |
| τ3 |                  | optical trap | reference white plate |
| τ4 | specimen         | optical trap | reference white plate |

\* see note in 7

7. Calculation

The haze (%) is calculated by the following equation.

Haze=[(τ4/τ2)−τ3(τ2/τ1)]×100 wherein τ1: the luminous flux of the incident light,
τ2: the total luminous flux transmitted through the specimen,
τ3: the luminous flux diffused by the apparatus, and
τ4: the luminous flux diffused by the apparatus and the specimen.

Reference: To accurately obtain the total light transmittance by using a single beam apparatus, it is necessary to place a specimen instead of an optical trap at the compensation opening (as specified in ISO13468-1). This is for the purpose of canceling a change in the efficiency of the integrating sphere. For another method, a measured value can be corrected and obtained by using a standard specimen calibrated by a double beam apparatus. However, since almost no difference exists in the obtained haze values, it is practically sufficient to use τ1 obtained by placing an optical trap instead of the specimen at the correction opening.

An Injection molding apparatus and conditions used for molding the "flat plate having a thickness of 3 mm obtained by injection molding using only the resin composition of the present disclosure as a raw material" are not particularly limited. For example, the injection molding can be performed by using EC130SXII-4A manufactured by Toshiba Machine Co., Ltd. For example, the molding conditions may be the following conditions.

Screw temperature: Five heaters from a raw material input port to an exit were respectively set to 60° C., 230° C., 240° C., 250° C., and 250° C. from the raw material input port side.
Injection speed: 90 mm/sec
Maximum injection pressure: 200 MPa
Kept pressure: 80 MPa
Mold temperature: 60° C.
Cooling timer: 45 seconds In one embodiment, the resin composition of the present disclosure is a resin composition containing the thermoplastic resin (A) and the silica composite oxide particles (B) wherein the content of the silica composite oxide particles (B) in the resin composition is 0.001 part by mass or more and 5 parts by mass or less relative to 100 parts by mass of the thermoplastic resin (A), and a difference in refractive index of the silica composite oxide particles (B) and the thermoplastic resin (A) measured at a wavelength of 589 nm at 25° C. is 0.03 or less. Such a resin composition can provide a molded body excellent in both scratch resistance and transparency.

The resin composition of the present disclosure may contain an ultraviolet absorber, an antioxidant, a release agent, an antistatic, a flame retardant, or the like, as needed. Examples of the ultraviolet absorber include benzophenone-based ultraviolet absorbers, cyanoacrylate-based ultraviolet absorbers, benzotriazole-based ultraviolet absorbers, malonic acid ester-based ultraviolet absorbers, oxalanilide-based ultraviolet absorbers, and the like; the examples of the antioxidant include phenol-based antioxidants, sulfur-based antioxidants, phosphorus-based antioxidants, and the like; examples of the release agent include higher fatty acid esters, higher aliphatic alcohols, higher fatty acids, higher fatty acid amides, higher fatty acid metal salts, fatty acid derivatives, and the like; examples of the antistatic include conductive inorganic particles, tertiary amines, quaternary ammonium salts, cationic acrylic acid ester derivatives, cationic vinyl ether derivatives, and the like; and examples of the flame retardant include cyclic nitrogen compounds, phosphorus-based flame retardants, silicon-based flame retardants, cage-like silsesquioxane or a partially cleaved structure thereof, silica-based flame retardants, ant the like.

The resin composition of the present disclosure is molded into a predetermined shape. Therefore, the present disclosure encompasses a molded body obtained by molding the resin composition of the present disclosure.

Example of a method for producing a molded body of the present disclosure include a method for molding the resin composition of the present disclosure by using a molding machine. Specifically, an injection molding method using an injection molding machine as a molding machine to perform the molding by injecting a resin composition into a mold of the molding machine for molding is preferable since a molded body having a complicated shape can be obtained.

A temperature of a cylinder during the injection molding is preferably 230° C. or more, and usually 290° C. or less.

The thickness of the molded body of the present disclosure is preferably 0.5 mm or more and 8 mm or less, more preferably 1 mm or more and 6 mm or less, further preferably 1 mm or more and 3 mm or less. By setting the thickness of the molded body within the above range, a molded body excellent in transparency can be obtained and can suitably be used, for example, as a vehicle lamp cover.

The resin composition of the present disclosure may form a layer of a laminated body. Therefore, the present disclosure encompasses a laminated body comprising a layer containing the resin composition of the present disclosure.

In one embodiment, the laminated body comprises a layer containing the resin composition of the present disclosure and a layer containing a thermoplastic resin (C). The laminated body of the present disclosure is excellent in balance between scratch resistance and transparency as compared to a single layer containing the resin composition of the present disclosure and a single layer containing the thermoplastic resin (C).

Examples of the thermoplastic resin (C) include the same resins as those described for the thermoplastic resin (A), i.e., (meth)acrylic resins, polycarbonate resins, polyetherimide resins, polyester resins, polystyrene resins, polyethersulfone resins, fluorine-based resins, ABS (acrylonitrile-butadiene-styrene) resins, AS (acrylonitrile-styrene) resins, polyvinyl chloride and polyolefin resins. The thermoplastic resin may be one resin or a mixture of two or more resins. The thermoplastic resin (C) is preferably the same resin as the thermoplastic resin used for the layer containing the resin composition of the present disclosure, i.e., the thermoplastic resin (A).

In one embodiment, the laminated body of the present disclosure is a laminated body comprising a layer containing the resin composition of the present disclosure and a layer containing the thermoplastic resin (C) wherein a flat plate having a thickness of 3 mm obtained by injection molding using only the thermoplastic resin (C) as a raw material satisfies equations 1' and does not satisfy at least one of equations 2 and 3 below:

$$x \leq 2; \quad \text{(Eq. 1')}$$

$$y < 12; \text{ and} \quad \text{(Eq. 2)}$$

$$y < 12x^{-0.75} \quad \text{(Eq. 3)}$$

wherein x is an initial haze (%) of the flat plate measured according to JIS K 7136 before a steel wool abrasion test, and y is an amount of change in the haze (%) of the flat plate with respect to the initial haze (%) measured according to JIS K 7136 after the steel wool abrasion test, and the steel wool abrasion test is a test in which #0000 steel wool is pressed against a surface of the flat plate at a pressure of 14 kPa and rubbed back-and-forth 11 times at a speed of 15 cm/sec in the direction perpendicular to the fiber direction of the steel wool.

In one embodiment, the laminated body of the present disclosure is a laminated body comprising a layer containing the resin composition of the present disclosure and a layer containing the thermoplastic resin (C) wherein a flat plate having a thickness of 3 mm obtained by injection molding using only the thermoplastic resin (C) as a raw material satisfies equation 1' below:

$$x \leq 2 \quad \text{(Eq. 1')}$$

wherein x is an initial haze (%) of the flat plate measured according to JIS K 7136 before a steel wool abrasion test, and the content of the silica composite oxide particles (B) in the layer containing the thermoplastic resin (C) is less than 0.001 part by mass with respect to 100 parts by mass of the thermoplastic resin (C).

In the laminated body, the thickness of the layer containing the resin composition of the present disclosure is preferably 0.1 mm or more and 8 mm or less, more preferably 0.5 mm or more and 6 mm or less, further preferably 0.8 mm or more and 3 mm or less.

In the laminated body, the thickness of the layer containing the thermoplastic resin (C) is preferably 0.5 mm or more and 8 mm or less, more preferably 1 mm or more and 6 mm or less, further preferably 1 mm or more and 3 mm or less.

The molded body and the laminated body of the present disclosure have high transparency and scratch resistance and therefore are suitably used, for example, as a vehicle lamp cover. Therefore, the present disclosure encompasses a lamp cover, particularly a vehicle lamp cover, comprising the molded body or the laminated body of the present disclosure.

Examples of the vehicle lamp covers include covers of headlights (headlamps), taillights (tail lamps), braking lights (stop lamps), directional lights (turn signals), fog lights (fog lamps), width indicators, and backup lights, and the like. The molded body and the laminated body of the present disclosure can suitably be used as covers for headlights (headlamps), i.e., headlamp covers, frequently rubbed by gravel etc. and required to have better scratch resistance.

The molded body and the laminated body of the present disclosure can suppress surface damages other than scratches, for example, damages caused by collision of particles such as sand.

EXAMPLES

The resin composition of the present disclosure will hereinafter be described with reference to Examples, and the contents of the present disclosure are not particularly limited to Examples.

(Transparency)

An initial haze of an obtained molded body or laminated body was measured according to JIS K 7136 before a steel wool abrasion test (in %). The smaller the initial haze is, the better the transparency, and especially when the initial haze is less than 8%, it can be said that the transparency is excellent.

(Scratch Resistance)

A surface of an obtained molded body or laminated body was subjected to an abrasion test using steel wool. Specifically, #0000 steel wool is pressed against a surface of the molded body or a surface of the laminated body with a load of 14 kPa and rubbed back-and-forth 11 times at a speed of 15 cm/sec in the direction perpendicular to the fiber direction of the steel wool. The haze of the molded body or the laminated body before and after the abrasion test was measured according to JIS K 7136 and a change in the haze before and after the test (Δhaze (in %)) was calculated. In the case of the laminated body, unless otherwise specified, the surface composed of the thermoplastic resin composition or the thermoplastic resin composition containing the silica composite oxide was rubbed. Particularly, when the Δhaze is less than 12%, it can be said that the scratch resistance is excellent.

When the initial haze is x %, $12x^{-0.75}$ is defined as a Δhaze threshold value (in %). Particularly, when the Δhaze is lower than the Δhaze threshold value, it can be said that the balance between transparency and scratch resistance is excellent.

(Inorganic Particles Used)

Silica-Titania SiTiO449 (average particle size: 0.4 μm, refractive index: 1.49)

Silica-Titania SiTiO448 (average particle size: 0.4 μm, refractive index: 1.48)

Silica-Titania SiTi0450 (average particle size: 0.4 μm, refractive index: 1.50)
Silica-Titania SiTi0451 (average particle size: 0.4 μm, refractive index: 1.51)
Silica-Titania SiTi0452 (average particle size: 0.4 μm, refractive index: 1.52)
Silica-Titania SiTi0349 (average particle size: 0.3 μm, Refractive index: 1.49)
Silica-Titania SiTi0849 (average particle size: 0.8 μm, Refractive index: 1.49)
Silica-zirconia SiZr0452 (average particle size: 0.4 μm, refractive index: 1.52)
Glass filler CF093-P5 (T4), manufactured by Nippon Frit Co., Ltd. (average particle size: 0.5 μm, refractive index: 1.495)
Sodium aluminosilicate Silton (registered trademark) AMT-08L manufactured by Mizusawa Industrial Chemicals Ltd. (average particle size: 0.9 μm, refractive index: 1.50)
Silica Sunseal (registered trademark) SS-04 manufactured by Tokuyama Corporation (average particle size: 0.4 μm, refractive index: 1.46)
Silica Admafine (registered trademark) S0-C2 manufactured by Admatex Co., Ltd. (average particle size: 0.5 μm, refractive index 1.46)
Titanium oxide MT-01 manufactured by TAYCA CORPORATION (average particle size: 10 nm)

(Preparation of Methacrylic Resin A)

Into a polymerization reactor equipped with a stirrer, a mixture of 97.5 parts by mass of methyl methacrylate and 2.5 parts by mass of methyl acrylate, 0.016 parts by mass of 1,1-di(tert-butylperoxy)cyclohexane, and 0.16 parts by mass of n-octyl mercaptan were each continuously supplied, and a polymerization reaction was performed at 175° C. for an average residence time of 43 minutes. Subsequently, a reaction solution (partial polymer) discharged from the polymerization reactor was preheated and then supplied to a devolatilization extruder to vaporize and recover an unreacted monomer component, and a pellet-shaped methacrylic resin A was obtained. The obtained methacrylic resin A contained 97.5% by mass monomer units derived from methyl methacrylate and 2.5% by mass monomer units derived from methyl acrylate, and MFR was 2 g/10 minutes. The refractive index was 1.49.

Example 1

<Melt Kneading>

After 0.06 parts by mass of SiTi0449 was added to 100 parts by mass of the methacrylic resin A and mixed, the resin was melt-kneaded and extruded into a strand shape under the following kneading conditions by using a twin-screw extruder (model: TEX30SS-30AW-2V) manufactured by Japan Steel Works and was cooled with water and cut with a strand cutter to obtain a pellet-shaped methacrylic resin composition.

(Kneading Conditions)
Extruder temperature: Eight heaters from a raw material input port to an outlet port were respectively set to 200° C., 200° C., 210° C., 220° C., 230° C., 240° C., 240° C., and 250° C. from the raw material input port side.
Rotation speed: 200 rpm
Raw material input speed: 12 kg/hour <Injection Molding>

The obtained pellet-shaped methacrylic resin composition was molded into a flat plate shape of 150 mm×90 mm×3.0 mm thickness by using an injection molding machine (EC130SXII-4A manufactured by Toshiba Machine Co., Ltd.) under the following molding conditions to obtain a molded body.

(Molding Conditions)
Screw temperature: Five heaters from the raw material input port to the outlet port were respectively set to 60° C., 230° C., 240° C., 250° C., and 250° C. from the raw material input port side.
Injection speed: 90 mm/sec
Maximum injection pressure: 200 MPa
Kept pressure: 80 MPa
Mold temperature: 60° C.
Cooling timer: 45 seconds The obtained molded body was allowed to stand in an oven at 80° C. for 16 hours and then slowly cooled for 4 hours to 40° C. and was evaluated in terms of transparency and scratch resistance. The results are shown in Table 2.

Examples 2 to 18

Molded bodies were obtained similarly to Example 1 except that inorganic particles and additive amounts described in Table 1 were used instead of addition of 0.06 parts by mass of SiTi0449. The evaluation results for transparency and scratch resistance are shown in Table 2.

Comparative Examples 1 to 14

Molded bodies were obtained similarly to Example 1 except that inorganic particles and additive amounts described in Table 1 were used instead of addition of 0.06 parts by mass of SiTi0449. The evaluation results for transparency and scratch resistance are shown in Table 2.

Comparative Example 15

A molded body was obtained similarly to Example 1 except that the methacrylic resin A was used as the material for injection molding without adding inorganic particles. The evaluation results for transparency and scratch resistance are shown in Table 2.

TABLE 1

|  | Inorganic particles | Inorganic particle additive amount [parts by mass] |
|---|---|---|
| Example 1 | SiTi0449 | 0.06 |
| Example 2 | SiTi0449 | 0.1 |
| Example 3 | SiTi0449 | 0.3 |
| Example 4 | SiTi0449 | 0.5 |
| Example 5 | SiTi0448 | 0.03 |
| Example 6 | SiTi0448 | 0.06 |
| Example 7 | SiTi0448 | 0.1 |
| Example 8 | SiTi0448 | 0.3 |
| Example 9 | SiTi0450 | 0.03 |
| Example 10 | SiTi0450 | 0.06 |
| Example 11 | SiTi0450 | 0.1 |
| Example 12 | SiTi0450 | 0.3 |
| Example 13 | SiTi0451 | 0.03 |
| Example 14 | SiTi0451 | 0.06 |
| Example 15 | SiTi0452 | 0.03 |
| Example 16 | SiTi0452 | 0.06 |
| Example 17 | SiZr0452 | 0.06 |
| Example 18 | SiZr0452 | 0.1 |
| Comparative Example 1 | CF0093-P5(T4) | 0.06 |
| Comparative Example 2 | CF0093-P5(T4) | 0.1 |
| Comparative Example 3 | CF0093-P5(T4) | 0.2 |

TABLE 1-continued

| | Inorganic particles | Inorganic particle additive amount [parts by mass] |
|---|---|---|
| Comparative Example 4 | AMT-08L | 0.1 |
| Comparative Example 5 | AMT-08L | 0.2 |
| Comparative Example 6 | AMT-08L | 0.5 |
| Comparative Example 7 | SS-04 | 0.03 |
| Comparative Example 8 | SS-04 | 0.06 |
| Comparative Example 9 | SS-04 | 0.1 |
| Comparative Example 10 | SS-04 | 0.3 |
| Comparative Example 11 | SS-04 | 0.5 |
| Comparative Example 12 | SO-C2 | 0.03 |
| Comparative Example 13 | SO-C2 | 0.06 |
| Comparative Example 14 | SO-C2 | 0.1 |
| Comparative Example 15 | — | — |

| | Initial haze [%] | Δhaze [%] | Δhaze threshold value [%] |
|---|---|---|---|
| Example 1 | 0.53 | 6.43 | 19.23 |
| Example 2 | 0.67 | 6.08 | 16.26 |
| Example 3 | 1.18 | 6.02 | 10.58 |
| Example 4 | 1.80 | 3.82 | 7.72 |
| Example 5 | 0.60 | 10.10 | 17.60 |
| Example 6 | 0.55 | 7.15 | 18.79 |
| Example 7 | 0.90 | 6.70 | 12.99 |
| Example 8 | 2.30 | 4.10 | 6.43 |
| Example 9 | 0.90 | 9.30 | 12.99 |
| Example 10 | 0.70 | 7.35 | 15.68 |
| Example 11 | 0.83 | 7.33 | 13.76 |
| Example 12 | 1.77 | 3.92 | 7.83 |
| Example 13 | 0.60 | 8.87 | 17.60 |
| Example 14 | 1.15 | 7.83 | 10.81 |
| Example 15 | 1.52 | 6.37 | 8.78 |
| Example 16 | 1.87 | 6.97 | 7.51 |
| Example 17 | 3.10 | 5.10 | 5.14 |
| Example 18 | 5.10 | 3.40 | 3.54 |
| Comparative Example 1 | 2.00 | 7.30 | 7.14 |
| Comparative Example 2 | 3.05 | 5.38 | 5.20 |
| Comparative Example 3 | 5.72 | 4.35 | 3.25 |
| Comparative Example 4 | 4.10 | 4.17 | 4.16 |
| Comparative Example 5 | 7.85 | 2.88 | 2.56 |
| Comparative Example 6 | 19.10 | 2.57 | 1.31 |
| Comparative Example 7 | 2.27 | 11.58 | 6.50 |
| Comparative Example 8 | 3.42 | 7.65 | 4.78 |
| Comparative Example 9 | 5.50 | 8.52 | 3.34 |
| Comparative Example 10 | 14.92 | 3.40 | 1.58 |
| Comparative Example 11 | 23.47 | 2.08 | 1.13 |
| Comparative Example 12 | 2.93 | 7.60 | 5.35 |
| Comparative Example 13 | 5.32 | 4.98 | 3.43 |
| Comparative Example 14 | 8.67 | 3.12 | 2.38 |
| Comparative Example 15 | 0.35 | 19.60 | 29.37 |

Example 19

<Injection Molding>

The pellet-shaped methacrylic resin composition obtained in Example 1 was molded into a flat plate shape of 150 mm×90 mm×1.0 mm thickness by using an injection molding machine (EC130SXII-4A manufactured by Toshiba Machine Co., Ltd.) under the following molding conditions to obtain a molded body.
(Molding Condition)
  Screw temperature: Five heaters from the raw material input port to the outlet port were respectively set to 60° C., 230° C., 240° C., 250° C., and 250° C. from the raw material input port side.
  Injection speed: 90 mm/sec
  Maximum injection pressure: 200 MPa
  Kept pressure: 80 MPa
  Mold temperature: 60° C.
  Cooling timer: 45 seconds <Multilayer Molding>

Subsequently, the obtained molded body was affixed to a mold of 150 mm×90 mm×3.0 mm thickness, and the methacrylic resin A was molded into a flat plate shape of 150 mm×90 mm×3.0 mm thickness by using an injection molding machine (EC130SXII-4A manufactured by Toshiba Machine Co., Ltd.) under the following molding conditions to obtain a laminated body composed of a layer containing the methacrylic resin composition which had 1.0 mm of thickness and a layer containing the methacrylic resin A which had 2.0 mm of thickness. The initial haze and the Δhaze of a single layer made of the methacrylic resin A which had 3.0 mm of thickness was 0.35% and 19.60%, respectively.
(Molding Conditions)
  Screw temperature: Five heaters from the raw material input port to the outlet port were respectively set to 60° C., 230° C., 240° C., 250° C., and 250° C. from the raw material input port side.
  Injection speed: 90 mm/sec
  Maximum injection pressure: 200 MPa
  Kept pressure: 80 MPa
  Mold temperature: 60° C.
  Cooling timer: 45 seconds The obtained laminated body was allowed to stand in an oven at 80° C. for 16 hours and then slowly cooled for 4 hours to 40° C. and was evaluated in terms of transparency and scratch resistance. The results are shown in Table 3.

Example 20

A laminated body was obtained similarly to Example 19 except that the pellet-shaped methacrylic resin composition obtained in Example 2 was used instead of the pellet-shaped methacrylic resin composition obtained in Example 1. The evaluation results for transparency and scratch resistance are shown in Table 3.

Example 21

A laminated body was obtained similarly to Example 19 except that the pellet-shaped methacrylic resin composition obtained in Example 3 was used instead of the pellet-shaped methacrylic resin composition obtained in Example 1. The evaluation results for transparency and scratch resistance are shown in Table 3.

Example 22

A laminated body was obtained similarly to Example 19 except that the pellet-shaped methacrylic resin composition obtained in Example 4 was used instead of the pellet-shaped methacrylic resin composition obtained in Example 1. The evaluation results for transparency and scratch resistance are shown in Table 3.

Example 23

A laminated body was obtained similarly to Example 19 except that the pellet-shaped methacrylic resin composition obtained in Example 8 was used instead of the pellet-shaped methacrylic resin composition obtained in Example 1. The evaluation results for transparency and scratch resistance are shown in Table 3.

Example 24

A laminated body was obtained similarly to Example 19 except that the pellet-shaped methacrylic resin composition obtained in Example 12 was used instead of the pellet-shaped methacrylic resin composition obtained in Example 1. The evaluation results for transparency and scratch resistance are shown in Table 3.

TABLE 3

| | Initial haze [%] | Δhaze [%] | Δhaze threshold value [%] |
|---|---|---|---|
| Example 19 | 0.65 | 7.63 | 16.58 |
| Example 20 | 0.67 | 7.50 | 16.26 |
| Example 21 | 0.90 | 5.52 | 12.99 |
| Example 22 | 1.30 | 4.57 | 9.86 |
| Example 23 | 1.60 | 5.67 | 8.44 |
| Example 24 | 1.30 | 5.75 | 9.86 |

Example 25

The molded body having 1.0 mm of thickness obtained in Example 19 was allowed to stand in an oven at 80° C. for 16 hours and then slowly cooled for 4 hours to 40° C. and was evaluated in terms of transparency and scratch resistance. The results are shown in Table 4.

Example 26

The evaluation was performed in terms of transparency and scratch resistance similarly to Example 25 except that the molded body having 1.0 mm of thickness obtained in Example 20 was used instead of the molded body having 1.0 mm thickness obtained in Example 19. The results are shown in Table 4.

Example 27

The evaluation was performed in terms of transparency and scratch resistance similarly to Example 25 except that the molded body having 1.0 mm of thickness obtained in Example 21 was used instead of the molded body having 1.0 mm thickness obtained in Example 19. The results are shown in Table 4.

Example 28

The evaluation was performed in terms of transparency and scratch resistance similarly to Example 25 except that the molded body having 1.0 mm of thickness obtained in Example 22 was used instead of the molded body having 1.0 mm of thickness obtained in Example 19. The results are shown in Table 4.

Example 29

The evaluation was performed in terms of transparency and scratch resistance similarly to Example 25 except that the molded body having 1.0 mm of thickness obtained in Example 23 was used instead of the molded body having 1.0 mm thickness obtained in Example 19. The results are shown in Table 4.

Example 30

The evaluation was performed in terms of transparency and scratch resistance similarly to Example 25 except that the molded body having 1.0 mm of thickness obtained in Example 24 was used instead of the molded body having 1.0 mm thickness obtained in Example 19. The results are shown in Table 4.

TABLE 4

| | Initial haze [%] | Δhaze [%] | Δhaze threshold value [%] |
|---|---|---|---|
| Example 25 | 0.48 | 11.10 | 20.70 |
| Example 26 | 0.52 | 8.28 | 19.69 |
| Example 27 | 0.88 | 5.60 | 13.17 |
| Example 28 | 1.30 | 5.58 | 9.86 |
| Example 29 | 0.95 | 6.47 | 12.47 |
| Example 30 | 1.30 | 6.27 | 9.86 |

Examples 31 to 35

Molded bodies were obtained similarly to Example 1 except that inorganic particles and additive amounts described in Table 5 were used instead of addition of 0.06 parts by mass of SiTi0449. The evaluation results for transparency and scratch resistance are shown in Table 6.

TABLE 5

| | Inorganic particles | Inorganic particle additive amount [parts by mass] |
|---|---|---|
| Example 31 | SiTi0349 | 0.06 |
| Example 32 | SiTi0349 | 0.1 |
| Example 33 | SiTi0749 | 0.06 |
| Example 34 | SiTi0749 | 0.1 |
| Example 35 | SiTi0748 | 0.3 |

TABLE 6

| | Initial haze [%] | Δhaze [%] | Δhaze threshold value [%] |
|---|---|---|---|
| Example 31 | 0.68 | 11.25 | 15.97 |
| Example 32 | 0.82 | 9.95 | 13.97 |
| Example 33 | 1.62 | 3.12 | 8.37 |
| Example 34 | 2.38 | 4.17 | 6.26 |
| Example 35 | 6.53 | 1.57 | 2.94 |

<Measurement and Analysis of X-Ray Absorption Fine Structure (XAFS) Spectrum>

Inorganic particles to be measured were filled in an IR tablet molding machine manufactured by JASCO Corporation with a 7-mm diameter inner cylinder set therein and were hydraulically pressed with a force of 1 ton to prepare a pellet having 7 mm of diameter.

Boron nitride may be added in order to make the Ti concentration in the pellet to be measured suitable for measurement. In this case, the inorganic particles to be measured and boron nitride may be pulverized and mixed in a mortar and then pelletized. Boron nitride does not contain the Ti element and therefore does not affect the XAFS spectrum of the K absorption edge of Ti measured by the following method.

The pellet was placed in a test tube and sealed with a stopper having a three-way cock. Subsequently, moisture was removed by heating at 350° C. for 2 hours under vacuum. The test tube depressurized inside was placed in a glove box in which moisture content and oxygen concentration were both controlled to less than 0.1 ppm, and the pellet was taken out from the test tube. Subsequently, the pellet was put in a Tedlar bag A and sealed by heat sealing. The Tedlar bag A was further put in another Tedlar bag B and sealed by heat sealing. Subsequently, the Tedlar bag B was put in an aluminum zip bag C and sealed by heat sealing, and the aluminum zip bag C was put in another aluminum zip bag D and sealed by heat sealing. As a result, the pellet was sealed in a double Tedlar bag and a double aluminum zip bag. In this state, the bags were taken out from the glove box, placed in a sealable container E, and carried in a depressurized state.

The measurement of the XAFS spectrum of the K absorption edge of Ti contained in the inorganic particles was performed by the QuickXAFS method using the XAFS measuring apparatus of Beamline BL-12C of Photon Factory, Institute of Materials Structure Science, High Energy Accelerator Research Organization. Immediately before the measurement, the sample was taken out from the container E, and the aluminum zip bags D and C were opened. The Tedlar back B was taken out from the inside, and the measurement was performed in the state of the Tedlar back B. A monochromator of Si (111) was used to monochromate the X-ray, and high frequencies were cut by using a Ni-coated mirror. An incident X-ray intensity ($I_0$) was measured at room temperature by using an ion chamber using $N_2$ (30 vol %)+He (70 vol %) as a gas, and a transmitted X-ray intensity ($I_t$) was measured at room temperature by using an ion chamber using $N_2$ as a gas. The measured energy range, interval, and integration time per measurement point were set as follows. For energy calibration, a rutile-type titanium oxide was used such that a first differential coefficient was maximized at a peak position of 4981.6 eV in the XANES spectrum at the K absorption edge thereof.

Energy range of incident X-ray: 4459.5 to 6064.5 eV
Data score: 3977 points
Scan time: 300 seconds
Integration: once From the above, $I_0$ and $I_t$ were measured at each incident X-ray energy (E, x-axis), the X-ray absorbance (y-axis) was obtained by the following equation, and an X-ray absorption spectrum was obtained by plotting on the x-axis/y-axis.

X-ray absorbance $\mu r = -\ln(I_t/I_0)$

From the X-ray absorption spectrum, the XAFS spectrum at the K absorption edge of Ti was obtained as follows. Specifically, after converting the obtained X-ray absorption spectrum data according to the QuickXAFS method into the format of EXAFS analysis software manufactured by Rigaku Corporation by using "Multi File Converter" provided by the High Energy Accelerator Research Organization, the XAFS spectrum was analyzed by using analysis software (REX2000 manufactured by Rigaku Corporation). Energy $E_0$ (x-axis) of the K absorption edge of Ti was set to an energy value (x-axis) at which the first differential coefficient is maximized in the spectrum near the K absorption edge of Ti in the X-ray absorption spectrum. The background of the spectrum is determined by applying the Victoreen equation ($A\lambda^3 - B\lambda^4 + C$; $\lambda$ is the wavelength of the incident X-ray, and A, B, C are arbitrary constants) to a spectrum in an energy range lower than the K absorption edge of Ti though the least-squares method, and the background was subtracted from the spectrum. The absorption intensity at 5128.0 eV was standardized as 1.0, and the absorption intensity at 4967.5 eV was calculated.

The tetra-coordinated Ti element has absorption at 4967.5 eV. Since the Ti element of titania is hexa-coordinated, the absorption intensity at 4967.5 eV is less than 0.3. On the other hand, since the Ti element in the silica-titania composite oxide having the Si element and the Ti element mixed at the atomic level is tetra-coordinated, the absorption intensity at 4967.5 eV is 0.5 or more.

Table 7 shows the absorption intensity at 4967.5 eV obtained from the XAFS spectra of SiTi0449, SiTi0448, SiTi0450, SiTi0452, and MT-01.

TABLE 7

| | Absorption intensity at 4967.5 eV |
|---|---|
| SiTi0449 | 0.88 |
| SiTi0448 | 0.88 |
| SiTi0450 | 0.85 |
| SiTi0452 | 0.85 |
| MT-01 | 0.10 |

<Measurement of TEM-EDX>

The inorganic particles were measured by using TEM-EDX. The Ti element was mapped in a field of view of 310 nm×310 nm at a magnification of 500,000 times. The presence or absence of an aggregate containing the Ti element and completely enclosing a 10 nm diameter circle was checked. The results are shown in Table 8.

TABLE 8

| | Aggregate containing Ti element and completely enclosing a 10 nm diameter circle |
|---|---|
| SiTiO449 | absent |
| SiTiO448 | absent |
| SiTiO450 | absent |
| SiTiO452 | absent |

<Measurement of SEM-EDX>

The inorganic particles were magnified 20,000 times by using SEM-EDX, and the element concentrations were measured in a field of view of 6.4 μm×4.8 μm. The results are shown in Table 9.

TABLE 9

| | Element concentration | | | | |
|---|---|---|---|---|---|
| | O element | Si element | Ti element | Zr element | Na element |
| SiTiO449 | 68.6 | 28.9 | 2.5 | 0 | 0 |
| SiTiO448 | 73.2 | 25.2 | 1.6 | 0 | 0 |
| SiTiO450 | 73.7 | 24.3 | 2.0 | 0 | 0 |
| SiTiO452 | 68.3 | 28.4 | 3.3 | 0 | 0 |
| SiZrO452 | 69.5 | 26.7 | 0 | 3.0 | 0.8 |
| SS-04 | 67.6 | 32.4 | 0 | 0 | 0 |
| S0-C2 | 66.0 | 34.0 | 0 | 0 | 0 |

INDUSTRIAL APPLICABILITY

The resin composition of the present disclosure can suitable used in applications in which transparency and scratch resistance are required, for example, vehicle exterior materials such as vehicle lamp covers, visors, and front grills, vehicle interior materials such as meter covers and in-vehicle display front panels, building materials such as windows and sound insulation walls, signboards, furniture such as table tops, shelves for exhibitions, exteriors such as carports, front panels of displays, and lighting equipment members such as covers and gloves.

The invention claimed is:

1. A resin composition comprising a thermoplastic resin (A) and silica composite oxide particles (B),
   wherein the thermoplastic resin (A) is a methacrylic copolymer containing monomer units derived from alkyl methacrylate with an alkyl group having 1 to 4 carbon atoms at 85% by mass or more and less than 100% by mass and monomer units derived from another vinyl monomer copolymerizable with the monomer units derived from alkyl methacrylate with an alkyl group having 1 to 4 carbon atoms at more than 0% by mass and 15% by mass or less,
   wherein silica composite oxide present in the silica composite oxide particles (B) is a material in which a portion of the silicon elements in silica is replaced with another element,
   wherein the silica composite oxide particles (B) is present in the resin composition in an amount of 0.001 part by mass or more and 5 parts by mass or less with respect to 100 parts by mass of the thermoplastic resin (A), and
   a flat plate having a thickness of 3 mm obtained by injection molding using only the resin composition as a raw material satisfies all equations 1 to 3 below:

$$x < 8; \quad \text{(Eq. 1)}$$

$$y < 12; \text{ and} \quad \text{(Eq. 2)}$$

$$y < 12x^{-0.75} \quad \text{(Eq. 3)}$$

wherein x is an initial haze (%) of the flat plate measured according to JIS K 7136 before a steel wool abrasion test,
   y is an amount of change in the haze (%) of the flat plate with respect to the initial haze (%) measured according to JIS K 7136 after the steel wool abrasion test, and
   the steel wool abrasion test is a test in which #0000 steel wool is pressed against a surface of the flat plate at a pressure of 14 kPa and rubbed back-and-forth 11 times at a speed of 15 cm/see in a direction perpendicular to the fiber direction of the steel wool.

2. The resin composition according to claim 1, wherein a difference in refractive index between the silica composite oxide particles (B) and the thermoplastic resin (A) when they are each irradiated with a light beam having a wavelength of 589 nm at 25° C. is 0.03 or less.

3. The resin composition according to 4 claim 1, wherein the silica composite oxide is a silica-titania composite oxide, a silica-zirconia composite oxide, or a silica-alumina composite oxide.

4. The resin composition according to claim 1, wherein
   the thermoplastic resin (A) is a methacrylic resin containing monomer units derived from methyl methacrylate at 85 to 100% by mass,
   the silica composite oxide is a silica-titania composite oxide containing titanium atoms at 0.01 to 10 mol % with respect to 100 mol % of all atoms of the silica composite oxide, and
   the content of the silica-titania composite oxide in the resin composition is 0.01 part by mass or more and 5 parts by mass or less with respect to 100 parts by mass of the methacrylic resin composition.

5. The resin composition according to claim 1, wherein
   the thermoplastic resin (A) is a methacrylic resin containing monomer units derived from methyl methacrylate at 85 to 100% by mass,
   the silica composite oxide is a silica-zirconia composite oxide containing zirconium atoms at 0.01 to 10 mol % with respect to 100 mol % of all atoms of the silica composite oxide, and
   the content of the silica-zirconia composite oxide in the resin composition is 0.01 part by mass or more and 5 parts by mass or less with respect to 100 parts by mass of the methacrylic resin composition.

6. The resin composition according to claim 1, wherein the silica composite oxide particles (B) in the resin composition form no aggregate image completely enclosing a 10 nm diameter circle in at least one of 10 images obtained by photographing the silica composite oxide particles (B) by using a TEM-EDX with a field of view of 310 nm×310 nm.

7. The resin composition according to claim 1, wherein a portion or all of the silica composite oxide particles (B) in the resin composition are a silica-titania composite oxide, the silica-titania composite oxide in the resin composition has an absorption intensity of 0.5 or more in an XAFS spectrum at a K absorption edge of Ti, and the absorption intensity is an absorption intensity at the incident X-ray energy of 4967.5 eV when the absorption intensity at the incident X-ray energy of 5128.0 eV has been standardized as 1.0.

* * * * *